Oct. 11, 1927.
J. B. HENDERSON
1,644,921
GYROSCOPIC INSTRUMENT AND APPARATUS
Original Filed July 26, 1919  2 Sheets-Sheet 1
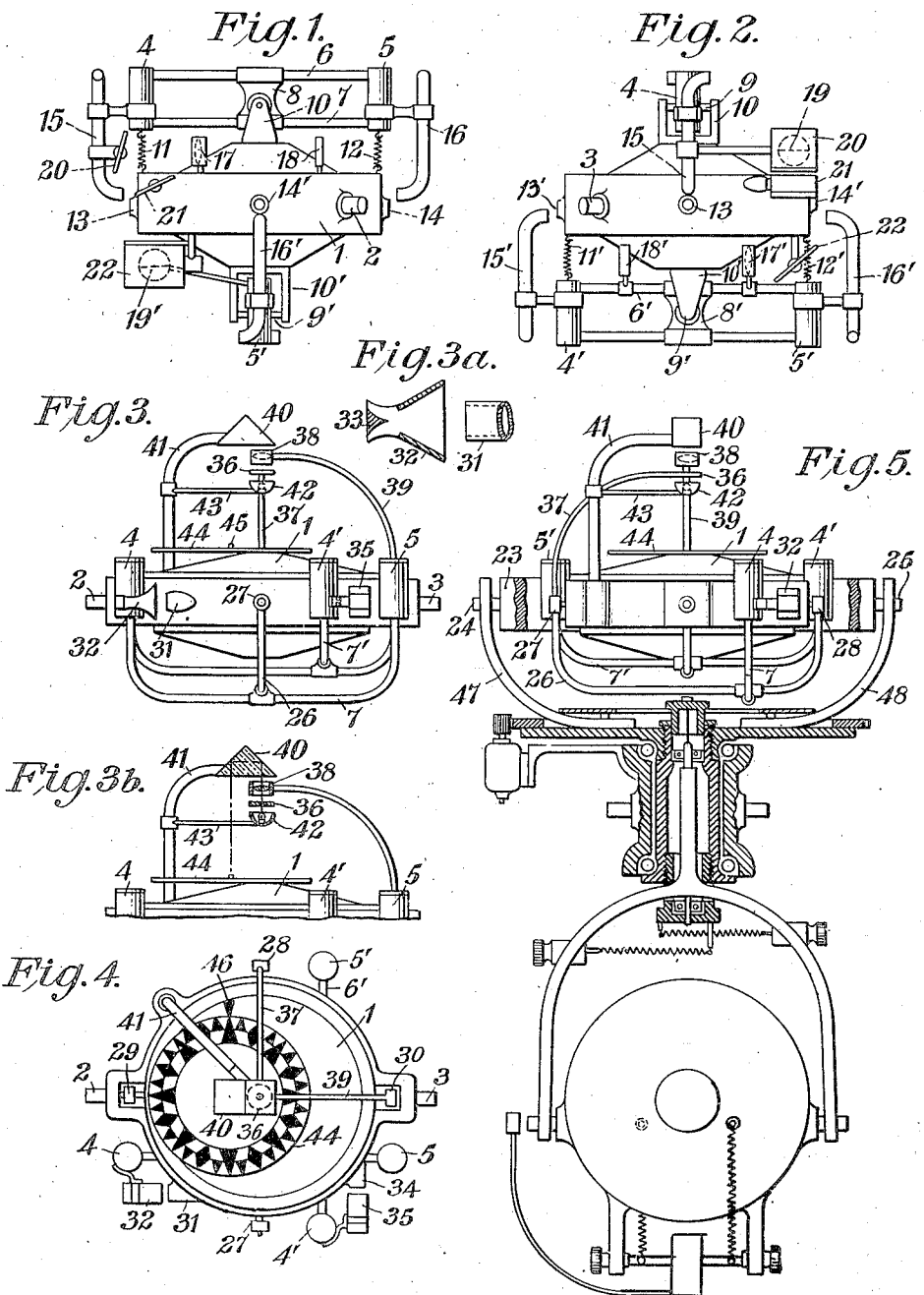

Oct. 11, 1927.
J. B. HENDERSON
GYROSCOPIC INSTRUMENT AND APPARATUS
Original Filed July 26, 1919  2 Sheets-Sheet 2
1,644,921
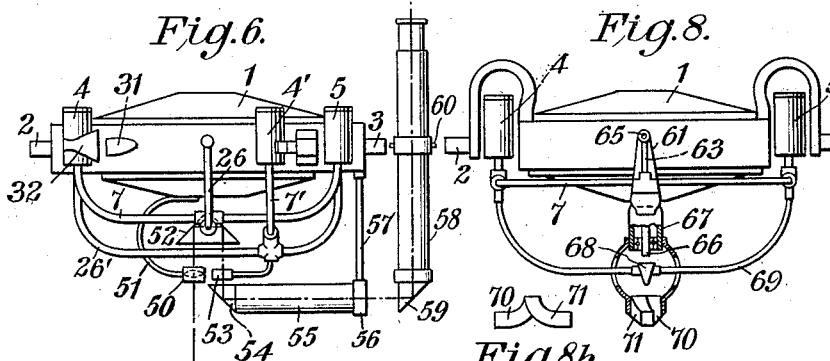
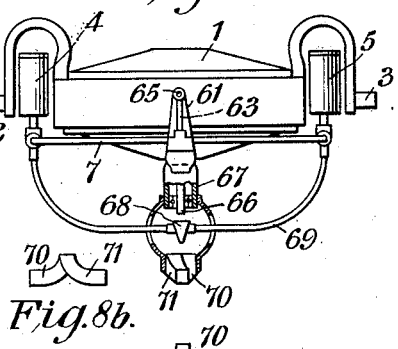
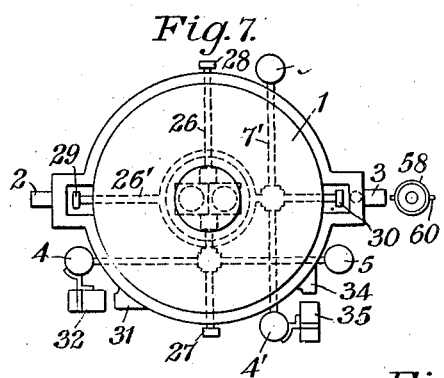
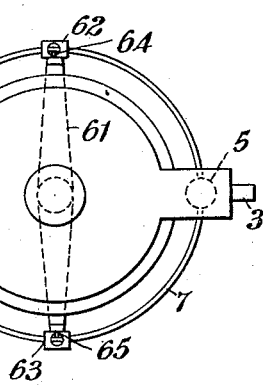
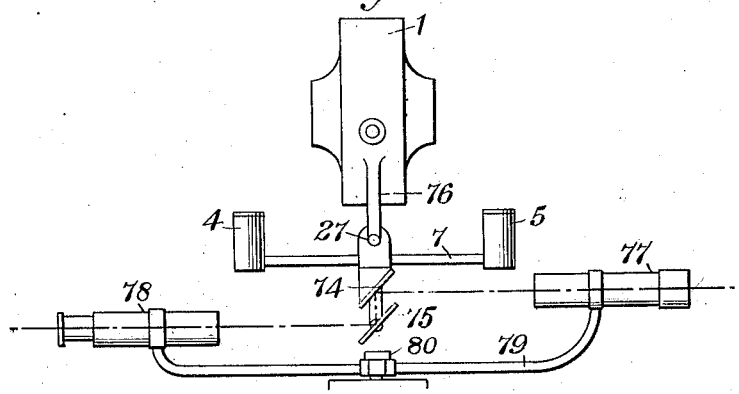
INVENTOR
James B. Henderson,
BY
Moakley and Gill
ATTORNEYS.

Patented Oct. 11, 1927.

1,644,921

UNITED STATES PATENT OFFICE.

JAMES BLACKLOCK HENDERSON, OF LEE, ENGLAND.

GYROSCOPIC INSTRUMENT AND APPARATUS.

Application filed July 26, 1919, Serial No. 313,540, and in Great Britain July 21, 1917. Renewed December 18, 1925.

(GRANTED UNDER THE PROVISIONS OF THE ACT OF MARCH 3, 1921, 41 STAT. L., 1313.)

In my copending application, Serial No. 313,537, filed July 26, 1919, I have described a number of methods of controlling a gyroscope, all of which have the common feature that the gyro is normally in neutral equilibrium but when tilted out of its normal position a level forms the primary agent which introduces the controlling forces. When a gyro has come to its steady state relatively to the earth or relatively to the vessel carrying it, it must then partake of the angular motion of the earth, and also of any angular motion round the earth of the vessel on which the gyro is mounted. These angular velocities of precession of the gyyro can only be produced by couples brought about by a displacement or displacements of the level or levels controlling the gyroscope, and my present invention consists in indicating or measuring these displacements of the levels relatively to the gyro in a practical manner so that the gyro can be used as a navigational instrument say for use on air-craft or sea-craft.

(a) for indicating the true vertical for position finding or bomb dropping.

(b) for indicating the course.

(c) for measuring the ground-speed of the air-craft, (d) for measuring the latitude at any place.

The instrument may be arranged for any of these functions or for a combination of them but in the following description they are treated separately, in some cases alternative designs being shown for one function.

Figs. 1 and 2 show two elevations in planes at right angles to each other of a form of instrument which I employ to indicate the true vertical for the purpose of determining the position of the air-craft by measuring the altitude of the sun or a star or for the purpose of range-finding by measuring the depression angle of the target or for bomb-dropping.

Figs. 3 and 4 are respectively elevation and plan of a course indicator, Fig. 3ª being a detail view of one of the air jets and its reaction nozzle, the nozzle being shown in section and Fig. 3ᵇ being a detail view, partly in section, of the optical parts of the instrument.

Fig. 5 is an elevation of a course indicator with its attached mechanism for converting it into a ground-speed measurer.

Figs. 6 and 7 show elevation and plan of an alternative design for determining the vertical on aircraft.

Figs. 8 and 9 show elevation and plan of an alternative design of course indicator.

Figures 8ª and 8ᵇ are details of the airchutes shown in Figures 8 and 9.

Fig. 10 shows an arrangement for determining ground speed or latitude from a gyro compass arranged according to my design.

Referring to Figs. 1 and 2 the gyro case 1, containing the gyro rotor pivoted on a vertical axis, is suspended so that it is normally in neutral equilibrium on trunnions 2 and 3 which are supported on a horizontal gimbal ring. This ring is not shown in the figure, for the sake of clearness, but it forms one of a set of gimbal rings similar to those used in compass binnacles. The gravitational constraint is produced by means of two levels at right angles placed one above and the other below the gyro. Each level consists of two vertical cylindrical cups 4 and 5 connected by means of two tubes 6 and 7 connected by the yoke 8 and pivoted on axis 9 on the bracket 10 which is rigidly attached to the gyro case 1. The corresponding elements of the lower level are indicated by the same numerals primed. Viscous fluid half fills cups 4 and 5 and the capillary tube 7. Each level is constrained relatively to the gyro by two springs 11 and 12. The damping or restoring couples on the gyro are introduced by means of four air jets which emerge radially from the gyro through the four nozzles 13, 14, 13′, 14′. The upper level carries the two jet tubes 15 and 16 the lower ends of which overlap to a certain extent the two jets 13 and 14 respectively, the air which is caught by the tube being delivered at the other end on a different level and at right angles to the entering jets. The reactions of these jets leaving the tubes produce the couples which restore the gyro axis to the vertical when displaced. It is evident that these couples vary with the tilt of the level relatively to the gyro case, that is, with the tilt of the gyro axis from the vertical and they may be made proportional to it.

A collimator consisting of a lens 17 with a diaphragm 18 placed in its focus, the diaphragm having a horizontal wire 19 across it, is attached rigidly to the gyro case. The lower collimator 17' 18' is shown alternatively attached to the level, its diaphragm 18' being provided with a horizontal wire 19' across it. The line of collimation of the collimator, in the symmetrical position of the level, is turned through 90° in the upper collimator by double reflection in the two mirrors 20 and 21 and in the lower collimator by single reflection in the mirror 22. The lower collimator arrangement is the simpler and is to be preferred for both. The two mirrors 21 and 22 are vertically over one another and are both semisilvered. The observer on looking down through the two mirrors sees the ground below with the images of the two wires 19 and 19' forming a cross on the ground. The point of intersection of the wires will thus indicate, under certain conditions, the point vertically below the observer. The conditions to be fulfilled are that the gyro is running, that the spring constraints on the two levels are such that if the gyro tilts through an angle $\alpha$, the upper level tilts relatively to the gyro through $\alpha/2$ and the lower level through $\alpha$. It is not necessary that the gyro should have settled down to a steady state.

By employing an angle measuring instrument of the sextant type to measure the elevation of the sun from the intersection of the cross wires mentioned above, the altitude of the sun can be determined and the latitude deduced. The cross wires may also be similarly employed as datum to determine the depression angle of a target for rangefinding. To make a bomb-dropping sight I may combine the instrument with a double reflector placed below the mirror 22 and attached to the aeroplane, the angle between the mirrors of the double reflector being set to give the proper bomb-dropping angle to the sight. For this purpose however I preferably combine the instrument with a low-magnification-telescope as described later, in connection with Figs. 6 and 7.

In Figs. 3 to 5 which show views of a course indicator and ground-speed measurer the gyro case 1 is supported on trunnions 2 and 3 in a horizontal gimbal ring 23, shown in section in Fig. 5, the latter being supported on two trunnions 24 and 25, so that the gyro is free to turn its axis in any direction. The gyro is also in neutral equilibrium on the trunnion axes. The gravity control is introduced by two levels 4—5—7 and 4'—5'—7' each consisting of two vertical cups 4 and 5 connected by a tube 7 and containing viscous fluid. The level 4—5 is carried by a wire frame 26 which is pivoted on the two small trunnions 27 and 28 on the gyro case. The level 4'—5' is similarly pivotally mounted on two trunnions 29 and 30. (Fig. 4.) The two pivotal axes of the levels pass through the centre of suspension of the gyro and when the levels are horizontal each is in neutral equilibrium on its trunnions. Thus the gravity control on the level is only due to the fluid flowing from one side to the other and it is therefore in unstable equilibrium on its trunnions. The level 4—5 is constrained relatively to the gyro by a jet of air issuing from a nozzle 31 on the gyro case, which passes through a chute 32 attached to the vessel 4 of the level. A section of the chute is shown in Fig. 3ᵃ, which shows that the jet issuing from the nozzle 31 passes through the hopper-shaped chute 32 and then divides on the triangular shaped blade 33 which is attached to the hopper. If the chute moves up or down relatively to the nozzle 31 more air is deflected up or down respectively and the force on the chute tends to keep it coaxial with the jet. It will be seen from the plan in Fig. 4 that the chute is not on the centre line hence the vertical forces on the chute due to the air jet introduce unequal vertical forces on the trunnions 27 and 28 and therefore produce a couple on the gyro which I shall call the restoring couple. If the gyro tilts so that the level 4—5 is inclined to the horizontal, the fluid flows towards one side, say towards 4 and the extra weight in 4 is supported by a vertical force on the chute 32 due to the air jet. The extra weight in 4 produces no direct couple on the gyro but only the restoring couple about the axis 2—3 due to the fact there is a greater couple on the pivot 27 than on the pivot 28 which is arranged so that it causes the gyro to precess back to the vertical again. The second level is controlled similarly by the jet issuing from nozzle 34 passing through chute 35. When the gyro axis is tilted out of the vertical it precesses straight back towards the vertical and if the vertical is changing its position in space, as it is always doing due to the earth's rotation, the gyro axis never reaches the vertical but always lags behind it by an amount proportional to the angular velocity of the vertical in space, i. e. by $\omega \cos \lambda$ if $\omega$ is the angular velocity of the earth and $\lambda$ the latitude. The gyro axis therefore always tilts to the west because the earth is rotating from east to west by an amount proportional to the cosine of the latitude unless additional means are taken for bringing the axis to the vertical.

I indicate and measure this tilt of the gyro axis preferably by magnifying it by optical means. One convenient method is illustrated in Figs. 3, 3ᵇ, 4 and 5. A diaphragm 36 having a small hole at the centre is supported by a bracket 37 from the frame 26 carrying the level 4—5 so that the diaphragm moves with the level. A short focus lens in a cell 38 is similarly supported by the bracket 39 from the level 4'—5'. A double reflection prism 40 is rigidly supported on the gyro case 1 by the pillar 41. The diaphragm 36 is illuminated by a small lamp in a shade 42 supported by a bracket 43 from the pillar 41. The lamp is energized by current from the same source which drives the gyro. A compass card 44 is attached to the gyro case on a pin 45 so that it can be turned round this pin by hand. A lubber line 46 is also attached to the gyro case. An image of the diaphragm 36 is formed by the lens 38 on the compass card 44 and the position of the spot of light on the card and its distance from the centre of the card indicate respectively the direction and the amount of the tilt of the gyro axis.

In the absence of any translational motion of the gyro relatively to the earth the spot of light will always lie to the west of the centre of the card. Hence by turning the card so that the spot of light is in line with the west mark the compass points are known. The distance of the spot of light from the centre of the card is then proportional to the cosine of the latitude and the E—W line for be graduated in degrees of latitude for a standard speed of rotor.

The instrument can be used as a compass on board ships or air-craft by turnng the compass card 44 round the centre pin 45 until the lubber line 46 is on the point of the compass corresponding to the course to be followed. The ship or air-craft is then steered so as to keep the spot of light always on the west point. This method is effective so long as the speed of the ship is small compared with the peripheral velocity of the earth's surface due to rotation round the axis. In latitude 60° the peripheral velocity of the earth's surface is about 450 knots, so that a speed of 7.5 knots along the meridian to N or S would deflect the spot of light one degree to the S or N respectively. To steer a correct course therefore the spot of light must be kept one point to the S or N of W for every 22.5 knots of component speed to N or S respectively.

When the instrument is to be used as a course indicator it cannot also be used as a ground-speed instrument for air-craft but if an independent course indicator is available, say another instrument of the same type or an independent gyro compass the sensitiveness of this instrument can be increased and the deviation due to the earth's rotation can be compensated so that the instrument then measures ground-speed of the air-craft on which it is mounted.

In order to compensate for the earth's rotation and to bring the spot of light to the centre of the card when the gyro has no motion relatively to the earth, I place a small weight either on the N end of the gyro case or on the west side of the level and to increase the sensitiveness I employ a lens 38 of shorter focal length. The observations of ground-speed in air-craft would usually be made periodically to determine the speed and direction of the wind relatively to the earth from time to time. If the aeroplane or air-ship can be steered by an independent instrument on a steady course for a few minutes with the weight on the N end say, the spot of light comes to a steady position, the distance from the centre and the bearing of which gives the ground-speed of the air-craft and its direction. Since the speed relatively to the air is known, the speed of the wind is easily deduced from the Dumaresque instrument for combining velocities. When great accuracy or frequent readings are required I mount the ground-speed indicator or meter on a gyro compass as is illustrated in Fig. 5, the type of gyro compass being one described in my previous British application No. 9062/17. The trunnions 24 and 25 are shown supported on brackets 47—48 which are rigidly attached to the following element of the compass so that the trunnions 24 and 25 are permanently east and west. I compensate for the earth's rotation as described above and I graduate the card 44 either in concentric circles or rectangularly in knots. The circles would give the ground speed and its direction whereas the rectangular divisions would give component speeds along and perpendicular to the meridian.

In the arrangements illustrated in Figs. 3, 4 and 5 the levels may be constrained relatively to the gyro by springs as well as by the air jets but the air jet control has the great advantage that the only precession of the gyro is opposite to the tilt of the level and it eliminates the conical precession of the gyro axis which is common in gyroscopes with gravitational stability or instability. If the levels have also spring control in addition to the air control the tilt of each level does not then give the ground speed parallel to the level as it does when there is no spring control. If the ground speed ahead and athwartships is required these can still be obtained by turning the instrument in azimuth relatively to the aeroplane so that the levels make with the fore-and-aft and athwartships lines an angle whose tangent is the ratio of the spring control to the jet control. The deviation of the spot of light in the fore-and-aft direction then measures the ground speed ahead and the deviation athwartships likewise measures the ground-speed athwartships.

It will be noted that if the instrument is not mounted on the gyro compass the weight which compensates the earth's rotation must always be turned by hand into its proper position relatively to the compass. I may alternatively apply this couple by means of a weight fixed to the card of a magnetic compass mounted on the gyro or I may apply it magnetically by attaching magnets to the gyro case. None of these arrangements however can be so satisfactory as the gyro compass arrangement illustrated in Fig. 5.

It is not necessary that the rotor axis of the gyro should be approximately vertical in an instrument controlled by two levels. It may be tilted at small angles by loading the level on the opposite side to the tilt to be produced in which case the level and gyro tilt together but for large tilts it would be necessary to tilt the gyro relatively to the level and alter the shape of the brackets which attach the air chutes to the level so that the chutes are coaxial with the air jets when the level is horizontal and the gyro is tilted at the required angle. I may tilt the gyro axis so that it is parallel to the earth's axis in which case the rotation of the earth has no effect on it and the deviation of the spot of light is then due to ground speed alone.

Although the gyro is tilted I prefer to keep the optical gear vertical and the card horizontal which is easily done by a small modification of the design in Figs. 3 and 4.

Figs. 6 and 7 show elevation and plan of an arrangement of gyroscope with levels controlled by air jets similar in every respect to Figs. 3 and 4 and numbered the same, but embodying a low power telescope for a bomb-dropping sight, the image on the cross wires of the telescope being that of the point on the ground vertically below the gyro. I shall only describe the optical features since the arrangement of levels has been described already.

The short focus objective of the telescope is mounted in the cell 50 which is attached to the gyro case by the bracket 51. The double reflection right angled prism 52 is rigidly attached to the frame 26 which carries the level 4—5 and the graticule 53 or cross wires of the telescope are carried by a bracket attached to the level 4'—5'. Thus if one level tilts, the prism moves and if the other level tilts, the graticule moves, these movements being at right angles to each other. An image of the ground below is formed by the lens 50 on the graticule 53 after double reflection in the prism 52. The remainder of the telescope consists of the usual combination of lenses common in periscopes in which wide field, low magnification and considerable length of tube are desirable. The tube is divided into two parts 55 and 58. Part 55 which is rigidly attached to the gyro case by the pillar 57 contains a reflecting prism 54 and a lens 56, the beams emerging from the lens 56 being parallel. Part 58 contains a reflecting prism 59 and the remaining lenses of the periscope. The tube part 58 is pivoted on trunnions 60 on separate gimbals attached to the aeroplane and does not form part of the gyro combination. It can be moved about on its gimbal by the observer so as to catch the beam emerging from the lens 56 and since that beam is parallel considerable latitude of relative motion of the two tubes 55 and 58 is possible without affecting the definition.

The jets controlling the levels have their strength adjusted so that the tilt of the level relatively to the gyro is equal to the tilt of the gyro axis from the vertical. When this condition is satisfied the image on the centre of the cross wires is always the point on the ground vertically below the gyro whether the gyro axis is vertical or not.

Figs. 8 and 9 show elevation and plan of an alternative arrangement of course indicator to that described in Figs. 3 and 4, and which employs only one level. The level cups 4 and 5 are connected by the tube 7 which is circular in plan. This tube is attached to two brackets 62 and 63 which are pivoted on two small trunnions 64 and 65 attached to a U-shaped frame 61. This frame is attached to a sleeve 67 pivoted on ball bearings on a hollow spindle 66 which is rigidly attached to the gyro case coaxial with the gyro rotor. The level is therefore free to turn round the vertical spindle 66. A jet of air is arranged to emerge from the spindle 66 by connecting the upper end by a tube or passage in the gyro case with the inside of the case near the periphery of the rotor. This jet controls the level by passing through the hopper shaped chute 68 which is attached to the level by the wire frame 69. After emerging from the chute 69 the air jet is again caught in one or other of two bent chutes 70 and 71 a plan of which is shown in Fig. 8ª and the side elevation in Fig. 8ᵇ, from which it will be seen that the air leaving these chutes leaves horizontally and also parallel to the bracket 61, since these chutes are rigidly attached to the bracket 61 and the sleeve 67 by wire frames 72 and 73, and therefore turn with the level round the spindle 66. The jet passing through the chute 68 controls the level and in doing so is deflected so that it is divided differently between the two chutes 70 and 71. The excess air in either of these chutes produces a couple on the gyro causing it to precess so as to annul the tilt of the gyro. The level naturally turns round the spindles 66 so that the cups are in the plane of the tilt of the gyro axis provided that tilt is sufficient, and since the gyro tilts to the west due to the rotation of the earth the level lies east and west if the gyro has no translational motion relatively to the earth. A compass ring card can therefore be attached to the ring tube 7 or on top of the cups 4 and 5 to indicate the points of the compass. The accuracy of setting of the card depends upon the tilt of the level relatively to the gyro and also upon the tilt of the gyro from the vertical. The latter may be increased without increasing the former by placing a small weight on the east side of the level; the former is limited by the air jet control.

In a gyro compass having its rotor axis horizontal and embodying my level control, valuable information regarding the accidental deviations of the compass at sea can be derived from accurate measurements of the variation of tilt of the level relatively to the gyro. When this tilt is steady its magnitude gives also the latitude if the component speed along the meridian is known or conversely if the latitude is known the tilt gives the speed along the meridian. Fig. 10 illustrates an optical method I may employ to measure this tilt accurately. I attach a mirror 74 to the level 4—5 which is pivoted on centres 27 on the lugs 76 projecting down from the gyro case 1, and another mirror 75 to a prolongation of one of the lugs 76. I employ a collimator 77 and telescope 78 the collimator having a scale in the focal plane and I read the position of the cross wire of the telescope on the image of the scale formed after double reflection in the mirrors 74 and 75. The telescope and collimator are conveniently fixed to a frame 79 which is pivoted on a central axis 80 attached to the binnacle so that the telescope can follow the azimuthal motion of the compass relatively to the ship. I may alternatively measure the same tilt by any of the other optical methods described above.

Having now particularly described and ascertained the nature of my said invention, and in what manner same is to be performed, I declare that what I claim is:—

1. In a gyroscopic navigational instrument, the combination of a movable system comprising a gyroscope, a universal support therefor and a liquid level device movably mounted on the gyroscope, the center of gravity of the system being substantially at the center of suspension and indicating means dependent upon relative displacement between the gyroscope and the device and comprising coacting optical elements connected respectively to the gyroscope and the device.

2. In a gyroscopic navigational instrument, the combination of a gyroscope, a liquid level device movably mounted on the gyroscope and indicating means dependent upon relative displacement between the gyroscope and the device and comprising coacting optical elements connected respectively to the gyroscope and the device.

3. In a gyroscopic navigational instrument, the combination of a movable system comprising a gyroscope, a universal support therefor and a pair of liquid level devices movably mounted on the gyroscope at right angles to each other, the center of gravity of the system being substantially at the center of suspension, and indicating means dependent upon relative displacement between the gyroscope and the device and comprising coacting optical elements connected respectively to the gyroscope and the device.

4. A gyroscopic navigational instrument comprising a gyroscope, a universal support for said gyroscope, a level pivotally mounted upon the gyroscope, fluid pressure means for constraining the level with respect to the gyroscope, and optical means for indicating the displacement of the level relatively to the gyroscope.

5. A gyroscopic navigational instrument comprising a gyroscope, a universal support for said gyroscope, a case for said gyroscope having an opening therein for the emission of air, a level pivoted to the case of the gyroscope, an air chute carried by the level for constraining it with respect to the case by the action of the air emitted therefrom and an optical system for indicating the displacement of the level relatively to the case.

6. A navigational instrument comprising a gyroscope mounted in neutral equilibrium, means displaceably connected to the gyroscope for imparting gravity control to the gyroscope, and means for indicating the displacement of the gravity control means relatively to the gyroscope.

7. A navigational instrument comprising a gyroscope mounted in neutral equilibrium, means displaceably connected to the gyroscope for imparting gravity control to the gyroscope, and means for indicating the displacement of the gravity control means relatively to the gyroscope comprising optical elements mounted on the gyroscope and on the device.

8. A navigational instrument comprising a gyroscope mounted in neutral equilibrium, a liquid level device displaceably connected to the gyroscope for imparting gravity control to the gyroscope, and means for indicating the dispalcement of the device relatively to the gyroscope.

9. A navigational instrument comprising a gyroscope mounted in neutral equilibrium, a pair of liquid level devices displaceably connected to the gyroscope and arranged at right angles to each other for imparting gravity control to the gyroscope and means for indicating the displacements of the devices relatively to the gyroscope.

10. A navigational instrument comprising a gyroscope mounted in neutral equilibrium a pair of liquid level devices displaceably connected to the gyroscope arranged at right angles to each other for imparting gravity control to the gyroscope, and means for indicating the displacements of the devices relatively to the gyroscope.

11. An instrument for use on a craft, comprising a gyroscope mounted in neutral equilibrium, means displaceably connected to the gyroscope for imparting gravity control to the gyroscope, and means comprising elements mounted on the gyroscope and on the gravity control means and actuated by relative movement between the gyroscope and the gravity control means for establishing a fixed datum relatively to the craft.

12. An instrument for use on a craft, comprising a gyroscope mounted in neutral equilibrium, means displaceably connected to the gyroscope for imparting gravity control to the gyroscope, and means comprising optical elements carried by the gyroscope and the gravity control means for stabilizing a line of sight relatively to the craft.

13. An instrument for use on a craft, comprising a support attached to the craft, a gyroscope mounted in neutral equilibrium on the support, means displaceably connected to the gyroscope for imparting gravity control to the gyroscope, and means comprising elements associated with the support, the gyroscope and the gravity control means for establishing a datum having a predetermined relation to the true vertical.

14. An instrument for use on a craft, comprising a support attached to the craft, a gyroscope mounted in neutral equilibrium on the support, means displaceably connected to the gyroscope for imparting gravity control to the gyroscope, and means comprising optical elements associated with the support, the gyroscope and the gravity control means for indicating a direction having a predetermined relation to the true vertical.

15. An instrument for use on a craft, comprising a gyroscope mounted in neutral equilibrium, a liquid level device displaceably connected to the gyroscope for imparting gravity control to the gyroscope, and means actuated by relative movement between the gyroscope and the device for establishing a fixed datum relatively to the craft.

16. An instrument for use on a craft, comprising a gyroscope mounted in neutral equilibrium, a liquid level device displaceably connected to the gyroscope for imparting gravity control to the gyroscope, and means comprising optical elements carried by the gyroscope and the device for stabilizing a line of sight relatively to the craft.

17. An instrument for use on a craft, comprising a support attached to the craft, a gyroscope mounted in neutral equilibrium on the support, a liquid level device displaceably connected to the gyroscope for imparting gravity control to the gyroscope, and means comprising elements associated with the support, the gyroscope and the device for establishing a datum having a predetermined relation to the true vertical.

18. An instrument for use on a craft, comprising a support attached to the craft, a gyroscope mounted in neutral equilibrium on the support, a liquid level device displaceably connected to the gyroscope for imparting gravity control to the gyroscope, and means comprising optical elements associated with the support, the gyroscope and the device for indicating a direction having a predetermined relation to the true vertical.

19. In a navigational instrument, a gyroscope having its spinning axis substantially vertical and means to prevent conical precession of the axis comprising two liquid level devices disposed at an angle to each other and movably mounted with respect to the gyroscope, and means associated with the gyroscope for producing air jets for controlling the movement of the devices relatively to the gyroscope, each of said devices being arranged to apply a torque to the gyroscope proportional to its tilt around the axis of the device to cause precession in the direction to annul the tilt.

20. In a navigational instrument, a gyroscope having its spinning axis substantially vertical and means responsive to tilting of the axis from the vertical to cause precession of the gyroscope to bring its axis back to the vertical by a rectilinear path comprising two liquid level devices disposed at an angle to each other and movably mounted with respect to the gyroscope, and means associated with the gyroscope for producing air jets for controlling the movement of the devices relatively to the gyroscope, each of said devices being arranged to apply a torque to the gyroscope proportional to its tilt around the axis of the device to cause precession in the direction to annul the tilt.

JAMES BLACKLOCK HENDERSON.